(12) United States Patent
 Van Wingerden

(10) Patent No.: US 8,997,397 B2
(45) Date of Patent: Apr. 7, 2015

(54) METHOD FOR DETERMINING HYDRATION REQUIREMENTS OF SUCCULENT PLANTS

(76) Inventor: Ben Van Wingerden, Stevensburg, VA (US)

( * ) Notice: Subject to any disclaimer, the term of this patent is extended or adjusted under 35 U.S.C. 154(b) by 318 days.

(21) Appl. No.: 13/598,197

(22) Filed: Aug. 29, 2012

(65) Prior Publication Data

US 2014/0059927 A1 Mar. 6, 2014

(51) Int. Cl.
*A01G 25/14* (2006.01)
*A01G 1/00* (2006.01)
*A01G 25/16* (2006.01)

(52) U.S. Cl.
CPC ............. *A01G 1/001* (2013.01); *A01G 25/16* (2013.01)

(58) Field of Classification Search
CPC ......... A01G 1/001; A01G 9/08; A01G 9/081; A01G 25/14; A01G 27/006
USPC .......... 47/39, 41.01, 44, 59 R, 59 S, 63, 65.5, 47/66.1, 66.6, 66.7, 86
See application file for complete search history.

(56) References Cited

U.S. PATENT DOCUMENTS

| | | | | | |
|---|---|---|---|---|---|
| 1,063,395 | A | * | 6/1913 | Soribner | 47/67 |
| 2,627,505 | A | * | 2/1953 | Goodwin et al. | 436/41 |
| 2,893,169 | A | * | 7/1959 | Shepherd | 47/47 |
| 3,233,365 | A | * | 2/1966 | Bergann | 47/64 |
| 5,421,122 | A | * | 6/1995 | Hyndman | 47/48.5 |
| 5,493,811 | A | * | 2/1996 | Tobias et al. | 47/79 |
| 6,185,866 | B1 | * | 2/2001 | Enfaradi | 47/79 |
| 2009/0223124 | A1 | * | 9/2009 | Pasquariello et al. | 47/66.1 |

* cited by examiner

*Primary Examiner* — Rob Swiatek
*Assistant Examiner* — Ebony Evans
(74) *Attorney, Agent, or Firm* — Acker Wood IP Law, LLC; Gwen R. Acker Wood

(57) ABSTRACT

The present invention provides an improved, quantitative, standardized method of hydrating succulent plants by a plant owner. The method includes calculating the amount of water and watering frequency required, depending on environmental conditions, such as substrate used to grow a plant, relative humidity and temperature, and using a demarcated container for watering the plant, all of which maintains and prolongs the health, vitality, beauty and longevity of the succulent plant.

9 Claims, 2 Drawing Sheets

METHOD FOR DETERMINING HYDRATION REQUIREMENTS OF SUCCULENT PLANTS

FIELD OF THE INVENTION

The present invention relates to the horticultural arts and, in particular, to methods for optimizing the determination of the amount of hydration required by succulent plants.

BACKGROUND OF THE INVENTION

Succulents are water-retaining plants from more than sixty families and three-hundred genera adapted to arid climates or soil conditions. Succulents have evolved special water-storage tissues in thickened or swollen leaves, stems or roots. By making the most of scarce available moisture, succulents can survive in the wild in habitats that are far too dry for most other plants.

Succulent plants grown domestically as house plants oftentimes are subjected to environmental conditions that are not beneficial for their survival. Extremes in temperature, humidity and aeration will cause stress on the plant which can lead to plant damage or death. In particular, over- and/or under-watering by plant owners can be especially harmful. Overwatering often results in plant death as constant wetness causes their roots to rot, which leaves the plant without a means for taking up nourishment. This causes their leaves to droop with the plant eventually dying. Because environmental conditions such as temperature and humidity needs to be considered, this makes determining the amount of water and the frequency of watering required by a succulent plant even more difficult for a plant owner.

There exists a need, therefore, for a quantitative, standardized way to determine the amount of water and watering frequency required by a succulent plant in order to maintain and prolong the plant's health, vitality and longevity.

SUMMARY OF THE INVENTION

The present invention fulfills this need by providing a quantitative, standardized method for determining hydration requirements of succulent plants to optimize their health, vitality, beauty and longevity.

The method comprises the steps of: (1) providing a succulent plant contained in a pot, said pot having a bottom of a certain diameter and cylindrical sides defining a space therein where the plant is contained; (2) measuring diameter of the pot; (3) multiplying the diameter of the pot by a certain percentage to obtain a number, said number equal to a volume of water; (4) optionally adding or subtracting a quantity of water to the volume of water calculated in step (3) depending on substrate contained in the pot, environmental relative humidity and environmental temperature; (5) providing a container, said container having a bottom and cylindrical sides which define a space therein, wherein the container accompanies the succulent plant upon sale or other disposition of ownership of the plant; (6) filling the space of the container with a volume of water equal to the volume of water calculated in steps (3) or (4); (7) adding the volume of water to the pot; and (8 repeating step (7) at a frequency which is determined by the substrate contained in the pot.

BRIEF DESCRIPTION OF THE DRAWINGS

A fuller understanding of the invention can be gained from the following description when read in conjunction with the accompanying drawings in which.

DETAILED DESCRIPTION OF THE INVENTION

As used herein, the terms "succulent plants" and "succulents" are meant to be interchangeable.

Figure 1:
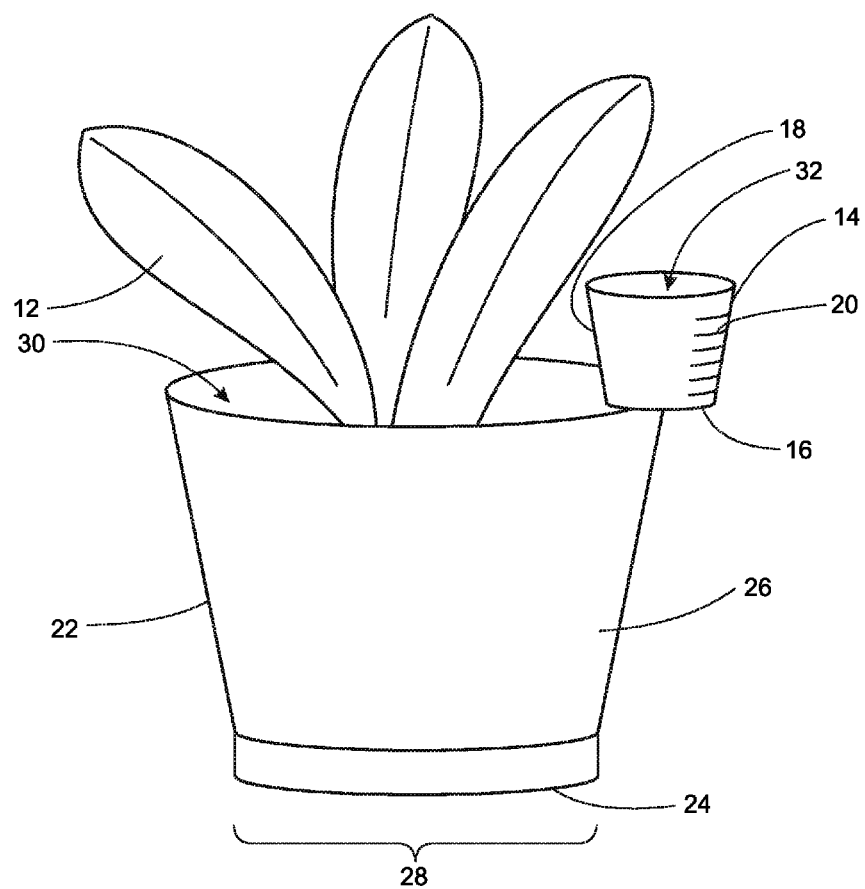
FIG. 1 shows a succulent plant in a pot accompanied by a container in accordance with the present invention.
Figure 2:
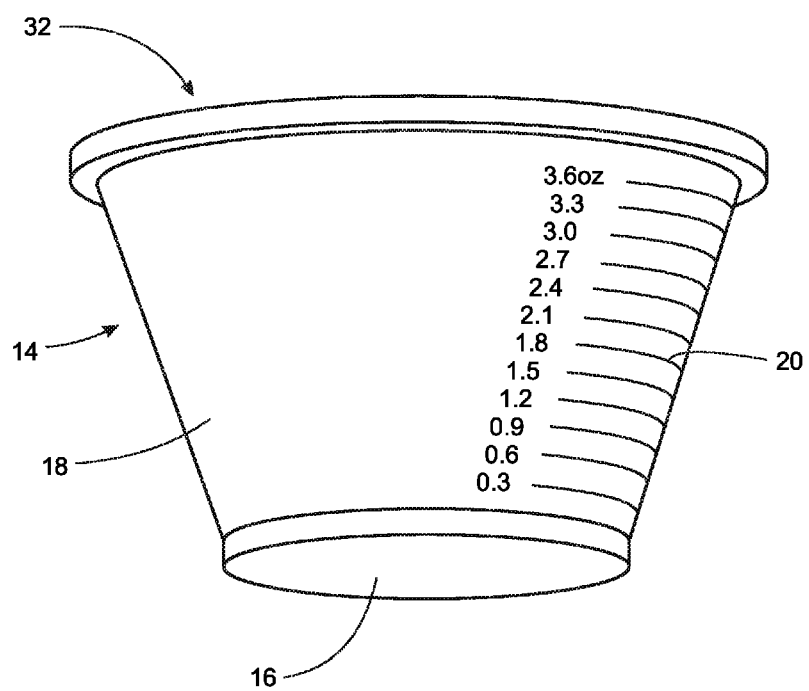
FIG. 2 shows a container having gradations thereon which accompanies a succulent plant in accordance with the present invention.

A fuller understanding of the methods of the present invention can be gained from the following detailed description when read in conjunction with FIGS. 1 and 2. The method comprises the following steps. Step 1 includes providing a succulent plant 12 contained in a pot 22. The pot 22 has a bottom 24 of a certain diameter 28 and cylindrical sides 26 defining a space therein where the plant is contained. Step 2 includes measuring the diameter 28 of the pot 24. Step 3 includes multiplying the diameter 28 of the pot 22 by a certain percentage to obtain a number equal to a volume of water. Step 4 includes optionally adding or subtracting a quantity of water to the volume of water obtained in step 3 depending on what type of substrate is contained in the pot 22, environmental relative humidity/and environmental temperature. Step 5 includes providing a container 14 having a bottom 16 and cylindrical sides 18 which define a space therein, wherein the container 14 accompanies the succulent plant 12 upon sale or other disposition of ownership of the plant 12. Step 6 includes filling the space of the container 14 with a volume of water equal to the volume of water calculated in steps 3 or 4. Step 7 includes adding the volume of water in the container 14 to the pot 22. Step 8 includes repeating step 7 at a frequency which is determined by the substrate contained in the pot 22.

In step 3, the percentage to which the diameter of the pot is multiplied ranges from between 40% to 80%. In an embodiment, the diameter of the pot is multiplied by 60%.

Depending on aeration properties of the substrate used to support, nourish and hydrate the succulent plant, a second volume of water may be added or subtracted to the volume of water calculated in step 3. If the substrate is characterized as having good aeration properties, a second volume of water is added; and, if the substrate is characterized as having poor aeration properties, a second volume of water is subtracted, to the volume of water.

The second volume of water can range from between about 10% to about 60% of the volume of water calculated in step 3. In an embodiment, the second volume of water is equal to about 30% of the volume of water calculated in step 3.

Any substrate commonly used for planting succulents is contemplated for use in the methods of the present invention, such as sphagnum moss, also referred to as peat moss, bark, or combinations thereof. In accordance with the methods of the present invention, if the substrate is substantially bark, then a second volume of water is added; and, if the substrate is substantially sphagnum moss or peat moss, then a second volume of water is subtracted.

Depending on the environmental relative humidity, a third volume of water may be added or subtracted to the volume of water calculated in step 3. If the environmental relative humidity is about 40% or lower, a third volume of water is added; and, if the environmental relative humidity is about 80% or higher, a third volume of water is subtracted. The third volume of water can range from between about 5% to about 50%. In an embodiment, the third volume of water is equal to about 25% of the volume of water calculated in step 3.

Depending on the environmental temperature, a fourth volume of water may be added or subtracted to the volume of water calculated in step 3. If the environmental temperature is about 80° F. or higher, a fourth volume of water is added; and, if the environmental temperature is about 50° F. or lower, a fourth volume of water is subtracted. The fourth volume of water can range from between about 10% to about 70%. In an embodiment, the fourth volume of water is equal to about 40%.

The frequency of watering the succulent plant in accordance with the methods of the present invention ranges from between about every 3 days to about every 7 days if the plant is planted in a substrate comprised substantially of bark, and between about every 8 days to about every 14 days if the plant is planted in a substrate comprised substantially of sphagnum moss or peat moss.

It is important that the temperature of the water used to hydrate the succulent plant is neither too cold nor too hot. Such extremes of water temperature can lead to damage or death of the plant. In accordance with the methods of the present invention, the temperature of the water added to the plant may range from between about 50° F. and about 100° F. In an embodiment, the temperature of the water is between about 70° F. and about 80° F.

Any suitable container 14 may be used to accompany the sale or other disposition of ownership of the plant in order to measure the volume of water added to the succulent plant 12, so long as the container 14 has clear gradations 20 shown on its surface to allow a person to measure the volume of water calculated in step 3 and step 4 of the method of the present invention (best shown in FIG. 2). The gradations 20 on the container 14 may be in units of ounces, grams, cubic centimeters or any other suitable unit that allows a person to measure the calculated volume of water. In an embodiment, the gradations are in ounces and increase by 0.3 increments per gradation starting with 0.3 ounces, for example and without limitation, 0.3, 0.6, 0.9, 1.2, 1.5, 1.8, 2.1, 2.4, 2.7, 3.0, 3.3 and 3.6 ounces.

The methods of the present invention allow for improved determination of the hydration needs for any succulent plant, including, without limitation, succulents from the following non-limiting families: Boweniaceae (Cycads), Cycadaceae (Cycads), Stangeriaceae (Cycads), Zamiaceae (Cycads), Welwitschiaceae, Araceae (Aroids), Arecaceae, Agavaceae (Agaves), Dracaenaceae (Dragon's Blood Tree), Nolinaceae (Bear Grasses), Ruscaceae (Japanese Sacred Lily), Amaryllidaceae (Amaryllis), Asphodelaceae, Aloaceae (Aloe), Hyacinthaceae (Bluebells), Orchidaceae (Orchids), Commelinaceae (Spiderworts), Dioscoreaceae (Wild Yams), Bromeliaceae (Pineapple), Poaceae (Grasses), Apiaceae (Carrots), Araliaceae (Ivy), Asteraceae (Daisies), Campanulaceae (Bell Flowers), Moringaceae (Horseradish Trees), Aizoaceae (Vygie or Ice Plants), Cactaceae (Cacti), Caryophyllaceae, Didieraceae, Portulacaceae (Purslanes), Icacinaceae, Begoniaceae (Begonias), Cucurbitaceae (Gourds), Balsaminaceae (Balsams), Fouquieriaceae (Ocotillos), Fabaceae (Beans), Apocynaceae (Periwinkles), Rubiaceae (Coffees, Ant Plants), Geraniaceae (Gerania), Gesneriaceae (Gesneriads), Lamiaceae (Mints), Dauphinea), Pedaliaceae (Sesames), Euphorbiaceae (Spurges), Passifloraceae (Passion Flowers), Bombacaceae, Melastomataceae, Oxalidaceae (Sorrels), Piperaceae (Pepper and Peperomia), Menispermaceae (Moonseeds or Curare), Moraceae (Figs and Mulberries), Urticaceae (Nettles), Anacardiaceae (Cashews), Burseraceae (Incense Trees, Torchwoods), Crassulaceae (Stonecrops or Plakkies), Convolvulaceae (Morning Glories), Vitaceae (Grapes), and Zygophyllaceae (Creosote Bushes).

In an embodiment, the succulent plant is an orchid plant.

Succulent plants require sufficient oxygen for root respiration, adequate but not over-hydration, and sunlight to maintain their health, vitality and longevity. Substrates for succulent plants serve several important functions: they hold and provide water and nutrients, maintain aeration of roots, and serve to anchor and support the roots of the plant. Different substrates vary with respect to their water retention capacity and degree of aeration. Coarse particles such as bark and coconut fibers provide more space for aeration. However, water retention is poor. On the other hand, fine substrates, such as sphagnum moss and fiber peat, have good water retention, but poor aeration. Thus, a substrate having a proper balance of good aeration and water retention is desired for health of succulents.

In addition to the substrate used to grow succulent plants, the environment in which the plant grows is important for determining the amount of water required by these plants. In a dry, arid and/or hot environment, more water is required due to more rapid evaporation of water through the leaves of the plant.

The method of the present invention described hereinabove therefore provides a quantitative, standardized method for determining hydration requirements of succulents by a plant owner which takes into account these environmental factors in order to maintain and prolong the health, vitality, beauty and longevity of the plants.

While the invention has been particularly shown and described with reference to embodiments described above, it will be understood by those skilled in the art that various alterations in form and detail may be made therein without departing from the spirit and scope of the invention, as defined by the appended claims.

What is claimed is:

1. A method of determining standardized and optimal hydration requirements of succulent plants and of hydrating succulent plants to optimize health, vitality and longevity of the plants, comprising the steps of:

(a) providing a succulent plant contained in a pot, said pot having a bottom of a certain diameter and cylindrical sides defining a space therein where the plant is contained; said pot containing a substrate selected from the group consisting of bark, sphagnum moss and peat moss;

(b) measuring the diameter of the pot;

(c) multiplying the diameter of the pot by a percentage ranging from about 40% to about 60% to obtain a first number, said first number equal to a first volume of water;

(d) multiplying the diameter of the pot by a percentage ranging from about 10% to about 60% to obtain a second number, said second number equal to a second volume of water, and adding the second volume of water to the first volume of water calculated in step (c) when the substrate contained in the pot is substantially bark, or subtracting the second volume of water from the first volume of water calculated in step (c) when the substrate is substantially sphagnum moss or peat moss;

(e) multiplying the diameter of the pot by a percentage ranging from about 5% to about 50% to obtain a third number, said third number equal to a third volume of water, and adding the third volume of water to the first volume of water calculated in step (c) if the environmental relative humidity is about 40% or lower, or subtracting the third volume of water from the first volume of water calculated in step (c) if the environmental relative humidity is about 80% or higher;

(f) multiplying the diameter of the pot by a percentage ranging from about 10% to about 70% to obtain a fourth number, said fourth number equal to a fourth volume of water, and adding the fourth volume of water to the first volume of water calculated in step (c) if the environmental temperature is about 80° F. or higher, or subtracting the fourth volume of water from the first volume of water calculated in step (c) if the environmental temperature is about 50° F. or lower;

(g) providing a container, said container having a bottom and cylindrical sides which define a space therein, said cylindrical sides having gradations thereon which delineate volume of water in ounces, wherein the container accompanies the succulent plant upon sale or other disposition of ownership of the plant;

(h) filling the space of the container with a final volume of water equal to the volume of water obtained in steps (c) through (f), wherein said first, said second, said third, said fourth and said final volumes are measured in ounces;

(i) adding the final volume of water to the pot; and (j) repeating step (i) at a frequency from between about every 3 days to about every 7 days if the substrate is comprised substantially of bark, and from between about every 8 days to about every 14 days if the substrate is comprised substantially of sphagnum moss or peat moss.

2. The method of claim 1, wherein the diameter of the pot is multiplied by a percentage of about 60% to obtain the first number equal to the first volume of water.

3. The method of claim 1, wherein the diameter of the pot is multiplied by a percentage of about 30% to obtain the second number equal to the second volume of water.

4. The method of claim 1, wherein the diameter of the pot is multiplied by a percentage of about 25% to obtain the third number equal to the third volume of water.

5. The method of claim 1, wherein the diameter of the pot is multiplied by a percentage of about 40% to obtain the fourth number equal to the fourth volume of water.

6. The method according to claim 1, wherein temperature of the water added to the plant ranges from between about 50° F. and about 100° F.

7. The method according to claim 1, wherein temperature of the water added to the plant ranges from between about 70° F. and about 80° F.

8. The method according to claim 1, wherein the succulents plants are selected from families selected from the group consisting of Boweniaceae (Cycads), Cycadaceae (Cycads), Stangeriaceae (Cycads), Zamiaceae (Cycads), Welwitschiaceae, Araceae (Aroids), Arecaceae, Agavaceae (Agaves), Dracaenaceae (Dragon's Blood Tree), Nolinaceae (Bear Grasses), Ruscaceae (Japanese Sacred Lily), Amaryllidaceae (Amaryllis), Asphodelaceae, Aloaceae (Aloe), Hyacinthaceae (Bluebells), Orchidaceae (Orchids), Commelinaceae (Spiderworts), Dioscoreaceae (Wild Yams), Bromeliaceae (Pineapple), Poaceae (Grasses), Apiaceae (Carrots), Araliaceae (Ivy), Asteraceae (Daisies), Campanulaceae (Bell Flowers), Moringaceae (Horseradish Trees), Aizoaceae (Vygie or Ice Plants), Cactaceae (Cacti), Caryophyllaceae, Didieraceae, Portulacaceae (Purslanes), Icacinaceae, Begoniaceae (Begonias), Cucurbitaceae (Gourds), Balsaminaceae (Balsams), Fouquieriaceae (Ocotillos), Fabaceae (Beans), Apocynaceae (Periwinkles), Rubiaceae (Coffees, Ant Plants), Geraniaceae (Gerania), Gesneriaceae (Gesneriads), Lamiaceae (Mints), Dauphinea), Pedaliaceae (Sesames), Euphorbiaceae (Spurges), Passifloraceae (Passion Flowers), Bombacaceae, Melastomataceae, Oxalidaceae (Sorrels), Piperaceae (Pepper and Peperomia), Menispermaceae (Moonseeds or Curare), Moraceae (Figs and Mulberries), Urticaceae (Nettles), Anacardiaceae (Cashews), Burseraceae (Incense Trees, Torchwoods), Crassulaceae (Stonecrops or Plakkies), Convolvulaceae (Morning Glories), Vitaceae (Grapes), and Zygophyllaceae (Creosote Bushes).

9. The method according to claim 1, wherein the succulent plant is an orchid plant.

* * * * *